(12) United States Patent
Kim et al.

(10) Patent No.: US 11,488,476 B2
(45) Date of Patent: Nov. 1, 2022

(54) DETECTION SYSTEM AND METHOD

(71) Applicant: Motional AD LLC, Boston, MA (US)

(72) Inventors: Junsung Kim, Pittsburgh, PA (US);
Junqing Wei, Bridgeville, PA (US);
Wenda Xu, Pittsburgh, PA (US);
Gaurav Bhatia, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 324 days.

(21) Appl. No.: 15/866,188

(22) Filed: Jan. 9, 2018

(65) Prior Publication Data

US 2019/0213884 A1    Jul. 11, 2019

(51) Int. Cl.
*G08G 1/16* (2006.01)
*G01S 13/931* (2020.01)
*B60W 30/08* (2012.01)
*H04L 67/12* (2022.01)
*H04W 84/18* (2009.01)
*G06V 20/58* (2022.01)

(52) U.S. Cl.
CPC .............. *G08G 1/16* (2013.01); *B60W 30/08* (2013.01); *G01S 13/931* (2013.01); *G06V 20/58* (2022.01); *H04L 67/12* (2013.01); *H04W 84/18* (2013.01); *B60W 2420/42* (2013.01); *B60W 2420/52* (2013.01); *B60W 2554/80* (2020.02)

(58) Field of Classification Search
CPC ............................................ G06V 20/50–588
See application file for complete search history.

(56) References Cited

U.S. PATENT DOCUMENTS

| 2018/0047287 | A1* | 2/2018 | Shimotsuma | G06V 20/58 |
| 2018/0101736 | A1* | 4/2018 | Han | G02B 27/01 |
| 2018/0107225 | A1* | 4/2018 | Nguyen | B60W 30/09 |
| 2019/0236955 | A1* | 8/2019 | Hu | G08G 1/096844 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

* cited by examiner

*Primary Examiner* — Lail A Kleinman
(74) *Attorney, Agent, or Firm* — Fish & Richardson P.C.

(57) ABSTRACT

A detection system includes a first-sensor, a second-sensor, and a controller. The first-sensor is mounted on a host-vehicle. The first-sensor detects objects in a first-field-of-view. The second-sensor is positioned at a second-location different than the first-location. The second-sensor detects objects in a second-field-of-view that at least partially overlaps the first-field of view. The controller is in communication with the first-sensor and the second-sensor. The controller selects the second-sensor to detect an object-of-interest in accordance with a determination that an obstruction blocks a first-line-of-sight between the first-sensor and the object-of-interest.

30 Claims, 6 Drawing Sheets

DETECTION SYSTEM AND METHOD

TECHNICAL FIELD OF INVENTION

This disclosure generally relates to a detection system, and more particularly relates to a detection system with a selectable perspective view.

BRIEF DESCRIPTION OF DRAWINGS

The present invention will now be described, by way of example with reference to the accompanying drawings, in which.

DETAILED DESCRIPTION

Figure 1:
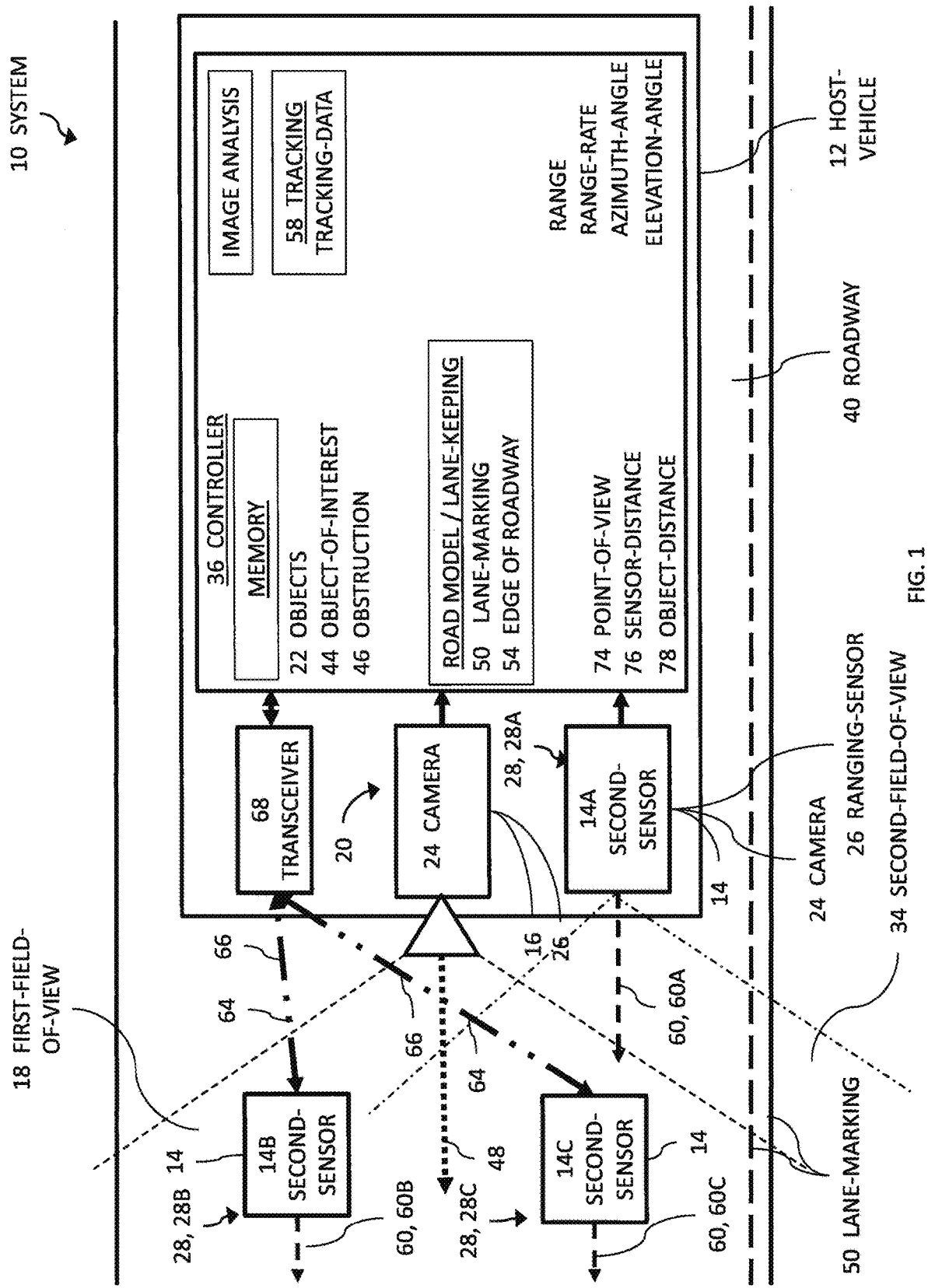
FIG. 1 is an illustration of a detection system in accordance with one embodiment.

FIG. 1 illustrates a non-limiting example of a detection system 10, hereafter referred to as the system 10, installed in a host-vehicle 12. As will be described in more detail below, the system 10 is an improvement over prior detection systems because the system 10 uses data from a second-sensor 14, remote from a first-sensor 16, when a first-field-of-view 18 of the first-sensor 16 is occluded, blocked, or otherwise obstructed.

The host-vehicle 12 may be characterized as an automated vehicle. As used herein, the term automated vehicle may apply to instances when the host-vehicle 12 is being operated in an automated-mode, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as an other-vehicle, a pedestrian, or a road sign.

The system 10 includes the first-sensor 16 positioned on the host-vehicle 12 at a first-location 20, such as on the front of the host-vehicle 12, or in the passenger-compartment of the host-vehicle 12. The first-sensor 16 detects objects 22 in the first-field-of-view 18, and is illustrated as a camera 24 in FIG. 1. Alternatively, the first-sensor 16 may be a ranging-sensor 26, such as a radar-sensor or a lidar-sensor. Examples of the camera 24 suitable for use on the host-vehicle 12 are commercially available as will be recognized by those in the art, one such being the APTINA MT9V023 from Micron Technology, Inc. of Boise, Id., USA. The camera 24 may be mounted in the first-location 20 that is on the front of the host-vehicle 12, or mounted in the interior of the host-vehicle 12 at a location suitable for the camera 24 to view the area around the host-vehicle 12 through the windshield of the host-vehicle 12. The camera 24 is preferably a video-type camera 24 or camera 24 that can capture images of the surrounding area at a sufficient frame-rate, of ten frames per second, for example.

The system 10 also includes the second-sensor 14 positioned at a second-location 28 that is different than the first-location 20. The second-location 28 may be on the host-vehicle 12 (shown as 28A), on a second-vehicle 30 (shown as 28B), or part of a transportation-infrastructure 32 (shown as 28C), as will be described in more detail below. Alternatively, the second-vehicle 30 may be referred to as the alternative-vehicle 30. The second-sensor 14 detects objects 22 in a second-field-of-view 34 that at least partially overlaps the first-field-of-view 18. Depending on the amount of overlap of the second-field-of-view 34 with the first-field-of-view 18, the objects 22 in the second-field-of-view 34 may include the same or different objects 22 than the objects 22 in the first-field-of-view 18, as will become apparent with a reading of the descriptions of the traffic scenarios of FIGS. 2-5 below. The object 22 that is detected in both the first-field-of-view 18 and the second-field-of-view 34 may be determined to be the same object 22 based on the position of the object 22. That is, the position of the object 22 may have the same coordinates of latitude, longitude, and elevation in the first-field-of-view 18 as the coordinates in the second-field-of-view 34.

The system 10 also includes a controller 36 in communication with the first-sensor 16 and the second-sensor 14. The first-sensor 16 and the second-sensor 14 may be hard-wired to the controller 36 through the host-vehicle's 12 electrical-system (not shown), or may be in wireless communication with the controller 36. The controller 36 may include a processor (not shown) such as a microprocessor or other control circuitry such as analog and/or digital control circuitry including an application specific integrated circuit (ASIC) for processing data as should be evident to those in the art. The controller 36 may include a memory (not specifically shown), including non-volatile memory, such as electrically erasable programmable read-only memory (EEPROM) for storing one or more routines, thresholds, and captured data. The one or more routines may be executed by the processor to perform steps for detecting the objects 22 based on signals received by the controller 36 from the first-sensor 16 and the second-sensor 14 as described herein.

Figure 2:
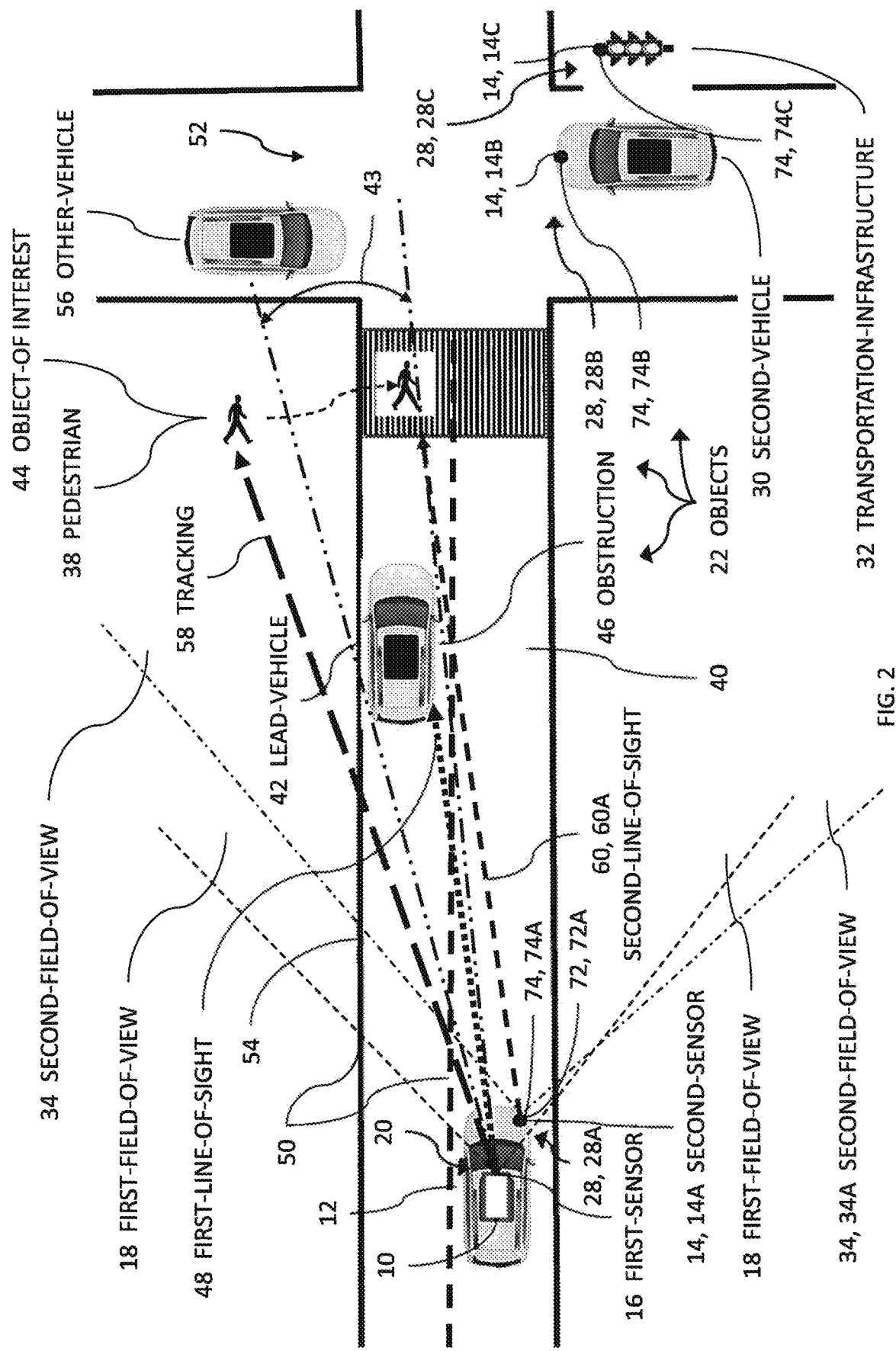
FIG. 2 is an illustration of a traffic scenario of a vehicle equipped with the detection system of FIG. 1 in accordance with one embodiment.

FIG. 2 illustrates a traffic scenario where the host-vehicle 12 equipped with the system 10 is approaching a crosswalk on a roadway 40 and a pedestrian 38 is also attempting to cross the roadway 40 in the crosswalk. A lead-vehicle 42 is disposed between the host-vehicle 12 and the pedestrian 38 such that the lead-vehicle 42 blocks a portion 43 of the first-field-of-view 18 of the first-sensor 16 (i.e. the camera 24).

The controller 36 selects the second-sensor 14A to detect an object-of-interest 44 (i.e. the pedestrian 38) in accordance with a determination that an obstruction 46 (i.e. the lead-vehicle 42) blocks a first-line-of-sight 48 between the first-sensor 16 and the object-of-interest 44. In the example illustrated in FIG. 2, the second-sensor 14A is mounted on a front right-corner of the host-vehicle 12. The second-sensor 14A may be one of either the camera 24 or the ranging-sensor 26 that is in a different location (i.e. the second-location 28A) relative to the first-sensor 16. The obstruction 46 may be any obstruction 46 including a building, signage, or construction-barriers, for example. In the example illustrated in FIG. 2, the object-of-interest 44 is the pedestrian 38 in the roadway 40, but may be any object-of-interest 44, including a lane-marking 50, a traffic-intersection 52, an edge 54 of the roadway 40, or an other-vehicle 56.

When the object-of-interest 44 is the lane-marking 50 and/or the edge 54 of the roadway 40, the system 10 provides the technical benefits of improving a road-model and/or improving a lane-keeping-algorithm that may use these features of the roadway 40 as inputs. When the object-of-interest 44 is the traffic-intersection 52, the system 10 provides the technical benefit of improving safety when the host-vehicle 12 is passing through the traffic-intersection 52 that is obscured by buildings, trucks, etc. In addition, the system 10 provides the technical benefit of improving safety when the host-vehicle 12 is making a left-hand turn at the traffic-intersection 52 behind a large vehicle (e.g. a Class 8 truck) that may block oncoming traffic or may obscure a traffic-light.

The controller 36 is able to determine that the obstruction 46 blocks the first-line-of-sight 48 based on a tracking 58 of the object-of-interest 44 prior to the obstruction 46 blocking the first-line-of-sight 48. The specific process of tracking 58 used by the controller 36 may be dependent upon the sensor-type (i.e., camera 24, ranging-sensor 26) and will be understood by those in the art. The controller 36 performs the tracking 58 based initially on signals received by the first-sensor 16 while the object-of-interest 44 is exposed (i.e. visible, unobstructed first-line-of-sight 48, etc.) in the first-field-of-view 18. The obstruction 46 may cause an abrupt loss of tracking-data from the object-of-interest 44 to the first-sensor 16, whereby the controller 36 determines that the obstruction 46 is present. The controller 36 then selects the second-sensor 14 with an unobstructed second-line-of-sight 60 to the object-of-interest 44. The second-sensor 14 then tracks 58 the object-of-interest 44 in the second-field-of-view 34, wherein the second-sensor 14 detects at least a part of the object-of-interest 44. In the example illustrated in FIG. 2, the controller 36 selects the second-sensor 14A mounted on the host-vehicle 12 with the second-line-of-sight 60A.

Described another way, the controller 36 tracks 58 the pedestrian 38 while the pedestrian 38 is in plain view of the first-sensor 16. When the view of the pedestrian 38 to the first-sensor 16 is blocked by the lead-vehicle 42, the controller 36 determines that the associated loss of tracking-data from the pedestrian 38 is caused by the lead-vehicle 42. The controller 36 then selects the second-sensor 14A, that has the unobstructed view of the pedestrian 38, to resume the tracking 58 of the pedestrian 38. If the view of the second-sensor 14A to the pedestrian 38 is blocked, then the controller 36 may select another second-sensor (14B or 14C) that has the unobstructed view of the pedestrian 38.

Figure 3:
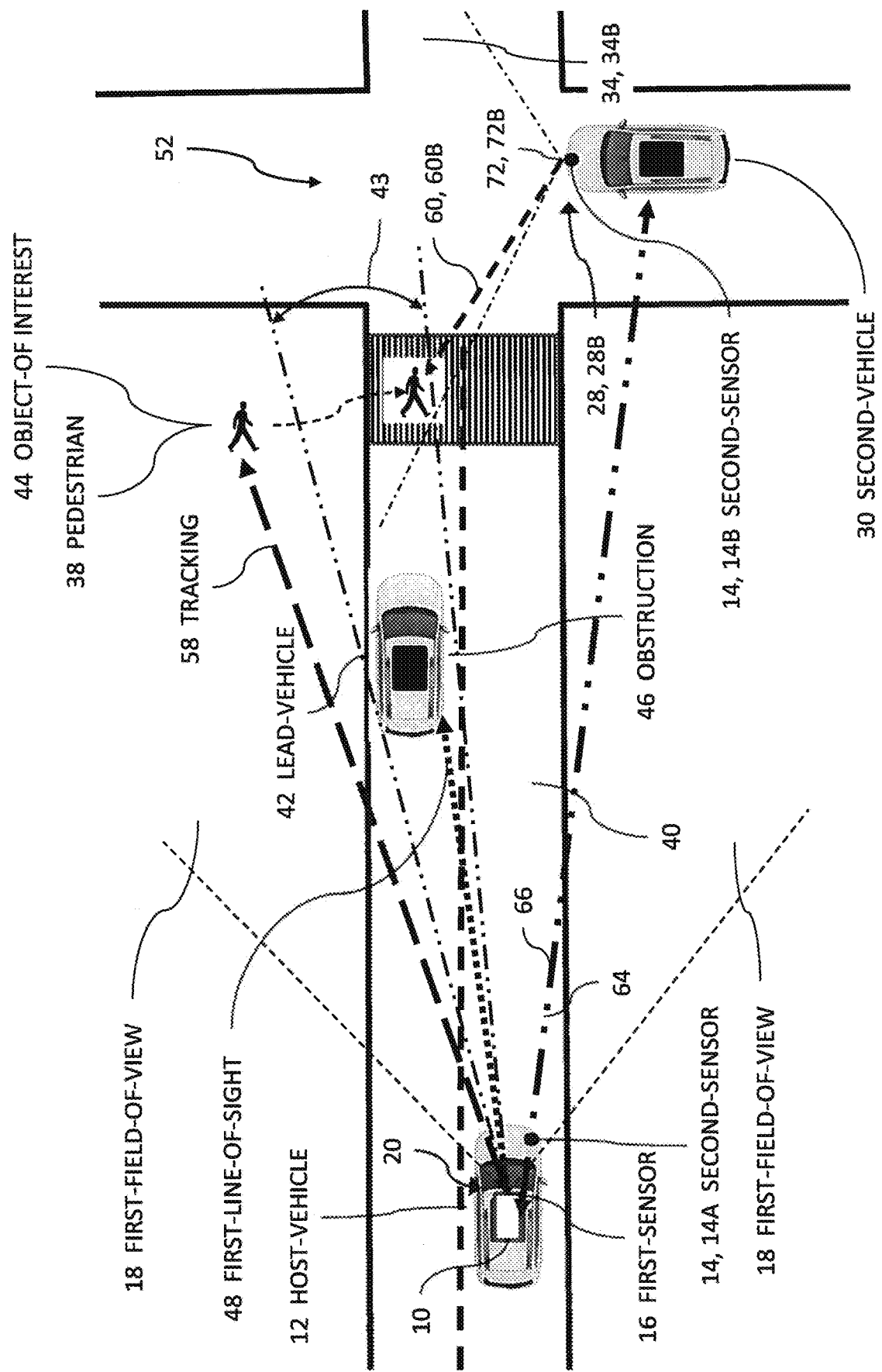
FIG. 3 is an illustration of another traffic scenario of a vehicle equipped with the detection system of FIG. 1 in accordance with one embodiment.

FIG. 3 illustrates another traffic scenario where the second-vehicle 30 is at the traffic-intersection 52 and the second-sensor 14B is mounted on the second-vehicle 30 that has the unobstructed view of the object-of-interest 44 (i.e. the pedestrian 38). The second-sensor 14B may be one of either the camera 24 or the ranging-sensor 26 that is in a different location relative to the first-sensor 16 (i.e. the second-location 28B). Data from the second-sensor 14B mounted on the second-vehicle 30 is both requested 64 and transferred 66 from the second-vehicle 30 to the host-vehicle 12 using a communications protocol, such as dedicated short range communications (DSRC), Bluetooth®, cellular or other ad hoc protocols. The data is both requested 64 and transferred 66 from the second-vehicle 30 by way of a transceiver 68 (see FIG. 1) mounted on the host-vehicle 12 that is also in communication with the controller 36.

Figure 4:
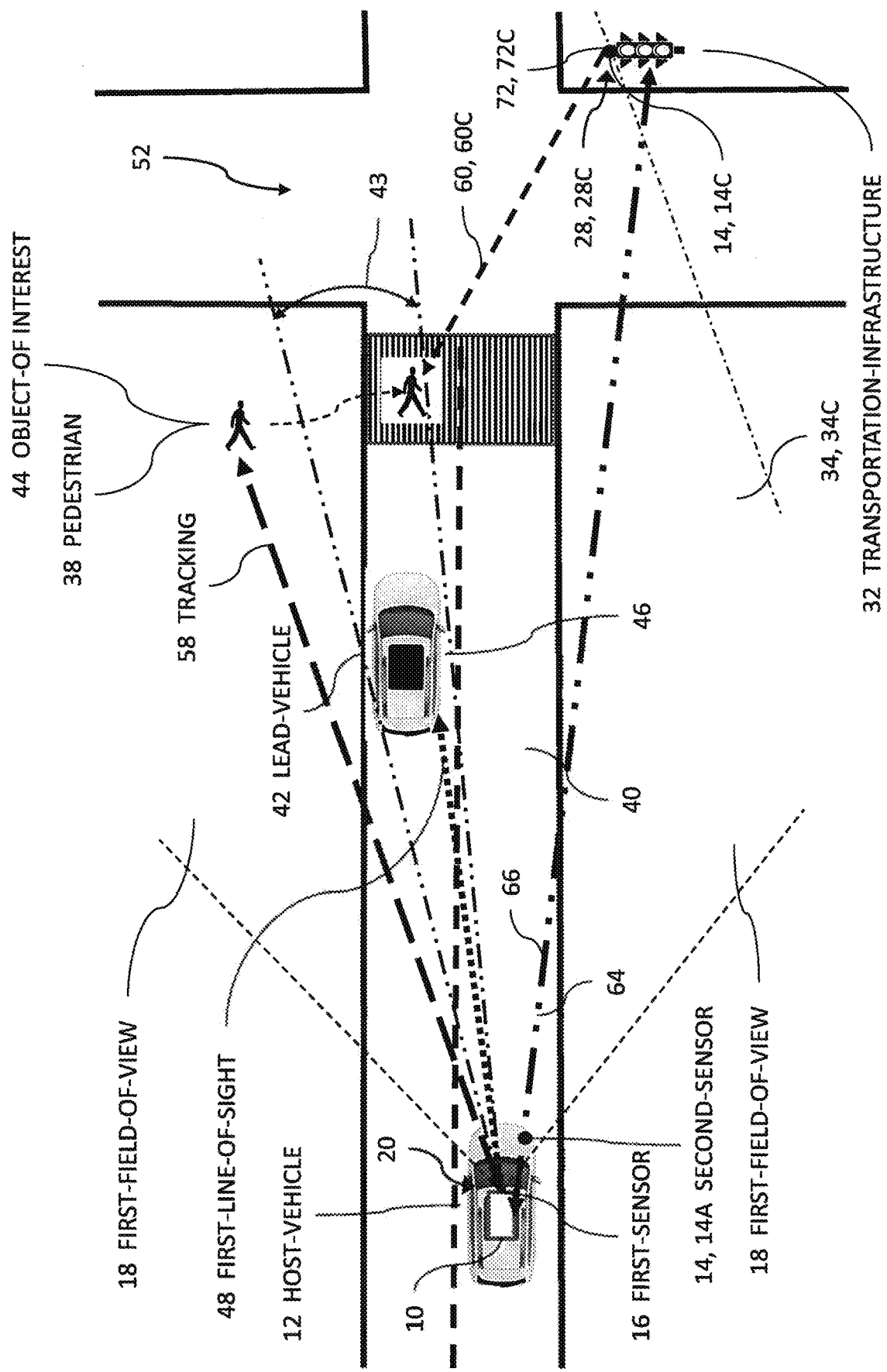
FIG. 4 is an illustration of yet another traffic scenario of a vehicle equipped with the detection system of FIG. 1 in accordance with one embodiment.

FIG. 4 illustrates yet another traffic scenario where the second-sensor 14C is part of the transportation-infrastructure 32 (e.g. mounted to a traffic light at the second-location 28C) located proximate the traffic-intersection 52, and has the unobstructed view of the object-of-interest 44. The second-sensor 14C may be one of either the camera 24 or the ranging-sensor 26 that is in a different location relative to the first-sensor 16. Data from the second-sensor 14C that is part of the transportation-infrastructure 32 is both requested 64 and transferred 66 from the transportation-infrastructure 32 to the host-vehicle 12 using a communications protocol, such as DSRC, UHF, VHF, Bluetooth®, cellular WiMAX, GSM, 3G or other ad hoc protocols. The data is both requested 64 and transferred 66 from the transportation-infrastructure 32 by way of the transceiver 68 mounted on the host-vehicle 12 that is also in communication with the controller 36, as illustrated in FIG. 1.

In the traffic scenarios illustrated in FIGS. 2-4, the second-sensor 14 may be a directional-sensor 72 where the second-field-of-view 34 (i.e. 34A-34C) may be adjusted to detect the object-of-interest 44. That is, the controller 36 may rotate the second-sensor 14 that is the directional-sensor 72 as necessary, and/or may change an angle-of-elevation of a bore-site of the second-sensor 14 as necessary to capture the object-of-interest 44. The controller 36 may adjust the second-field-of-view 34 as required to resume tracking 58 the object-of-interest 44.

Figure 5:
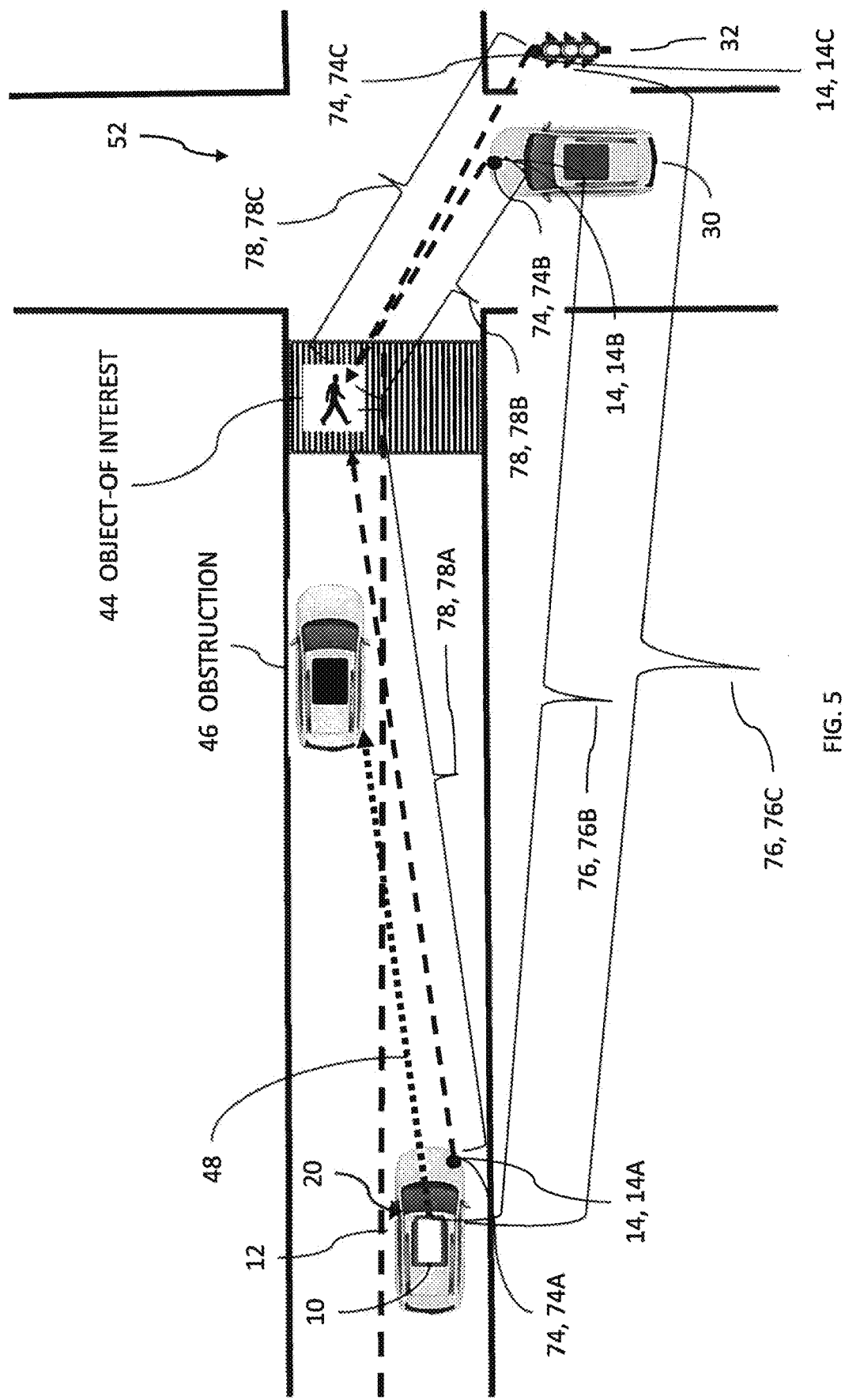
FIG. 5 is an illustration of yet another traffic scenario of a vehicle equipped with the detection system of FIG. 1 in accordance with one embodiment.

FIG. 5 illustrates yet another traffic scenario with all three second-sensors 14A-14C 14C present. The controller 36 may further select the second-sensor 14 based on a proximity of the second-sensor 14 to both the host-vehicle 12 and the object-of-interest 44. The controller 36 polls (i.e. samples, surveys) the available second-sensors 14 within a communications-range via the second-sensor's 14 respective communications protocol and prioritizes the data based on the second-sensor's 14 point-of-view 74, sensor-distance 76 from the host-vehicle 12, and object-distance 78 to the object-of-interest 44. As used herein, the point-of-view 74 is the position of the second-sensor 14 from which the object-of-interest 44 is detected. The controller 36 may select the second-sensor 14 with the point-of-view 74 that provides a least obstructed view of the object-of-interest 44. For example, the second-sensor 14B mounted on the second-vehicle 30 provides the least obstructed point-of-view 74B of the pedestrian 38 compared to the point-of-view 74A of the second-sensor 14A mounted on the host-vehicle 12. Therefore, the second-sensor 14B may be assigned a higher priority than the second-sensor 14A. Similarly, the second-sensor 14C mounted to the traffic light may have the least obstructed view of the pedestrian 38 compared to the second-sensor 14B mounted on the second-vehicle 30 (possibly due to its greater elevation above the traffic-intersection 52), and may be assigned a higher priority than the second-sensor 14B.

The sensor-distance 76 from the host-vehicle 12 (i.e. the distance from the second-sensor 14B, 14C to the host-vehicle 12) is prioritized because a signal-strength and a signal-quality of the data transferred 66 by the second-sensor 14B-14C may be affected by the sensor-distance 76B, 76C. Therefore, the second-sensor 14B, 14C with the shortest sensor-distance 76B, 76C may be assigned a higher priority by the controller 36.

The object-distance 78 (i.e. the distance from the second-sensor 14 to the object-of-interest 44) is prioritized because a resolution of the object-of-interest 44 depicted in the image produced by the second-sensor 14 may be affected by the object-distance 78A, 78B, 78C. Therefore, the second-sensor 14 with the shortest object-distance 78A, 78B, 78C may be assigned a higher priority by the controller 36.

The controller 36 may also prioritize the second-sensor 14 by a sensor-type (i.e. the camera 24 or the ranging-sensor 26). The controller 36 may assign the higher priority to the second-sensor 14 that provides the higher resolution of the object-of-interest 44 depicted in the image produced by the second-sensor 14. The inherent resolutions of the various sensor-types will be understood by one skilled in the art.

Figure 6:
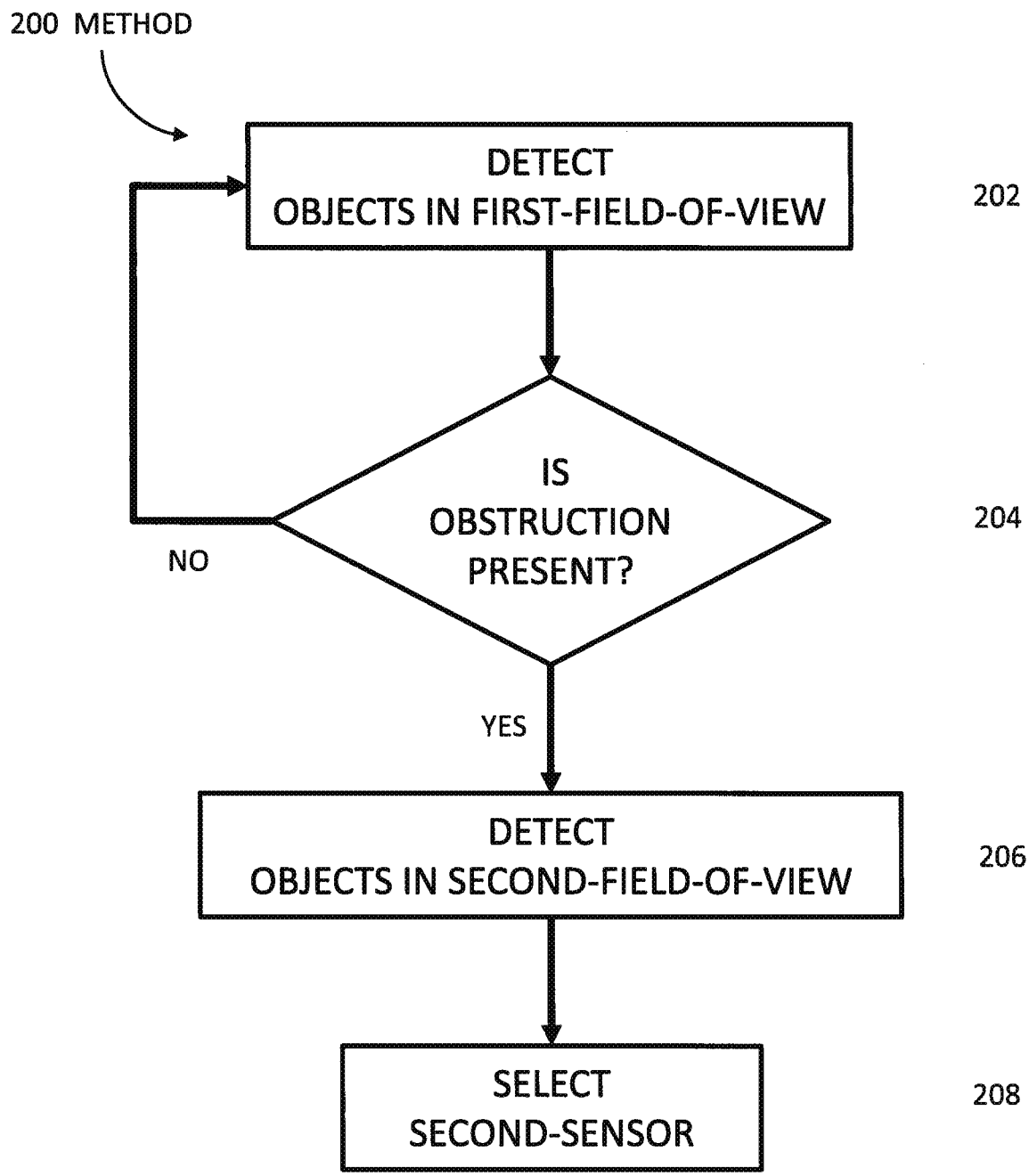
FIG. 6 is a flowchart of a method of operating a detection system in accordance with another embodiment.

FIG. 6 illustrates a method 200 of operating a detection system 10, hereafter referred to as the system 10, installed in a host-vehicle 12.

Step 202, DETECT OBJECTS IN FIRST-FIELD-OF-VIEW, includes detecting objects 22 in a first-field-of-view 18 with a first-sensor 16 mounted on the host-vehicle 12.

FIG. 1 illustrates a non-limiting example of the detection system 10 installed in the host-vehicle 12. As will be described in more detail below, the system 10 is an improvement over prior detection systems because the system 10 uses data from a second-sensor 14, remote from the first-sensor 16, when the first-field-of-view 18 of the first-sensor 16 is occluded, blocked, or otherwise obstructed.

The system 10 includes the first-sensor 16 positioned on the host-vehicle 12 at a first-location 20, such as on the front of the host-vehicle 12, or in the passenger-compartment of the host-vehicle 12. The first-sensor 16 detects objects 22 in the first-field-of-view 18, and is illustrated as a camera 24 in FIG. 1. Alternatively, the first-sensor 16 may be a ranging-sensor 26, such as a radar-sensor or a lidar-sensor. Examples of the camera 24 suitable for use on the host-vehicle 12 are commercially available as will be recognized by those in the art, one such being the APTINA MT9V023 from Micron Technology, Inc. of Boise, Id., USA. The camera 24 may be mounted in the first-location 20 that is on the front of the host-vehicle 12, or mounted in the interior of the host-vehicle 12 at a location suitable for the camera 24 to view the area around the host-vehicle 12 through the windshield of the host-vehicle 12. The camera 24 is preferably a video-type camera 24 or camera 24 that can capture images of the surrounding area at a sufficient frame-rate, of ten frames per second, for example.

Step 204, DETERMINE OBSTRUCTION PRESENT, includes determining whether an obstruction 46 blocks a first-line-of-sight 48 to an object-of-interest 44.

The system 10 also includes a controller 36 in communication with the first-sensor 16 and the second-sensor 14. The first-sensor 16 and the second-sensor 14 may be hard-wired to the controller 36 through the host-vehicle's 12 electrical-system (not shown), or may be in wireless communication with the controller 36. The controller 36 may include a processor (not shown) such as a microprocessor or other control circuitry such as analog and/or digital control circuitry including an application specific integrated circuit (ASIC) for processing data as should be evident to those in the art. The controller 36 may include a memory (not specifically shown), including non-volatile memory, such as electrically erasable programmable read-only memory (EEPROM) for storing one or more routines, thresholds, and captured data. The one or more routines may be executed by the processor to perform steps for detecting the objects 22 based on signals received by the controller 36 from the first-sensor 16 and the second-sensor 14 as described herein.

The controller 36 is able to determine that the obstruction 46 blocks the first-line-of-sight 48 based on a tracking 58 of the object-of-interest 44 prior to the obstruction 46 blocking the first-line-of-sight 48. The specific process of tracking 58 used by the controller 36 may be dependent upon the sensor-type (i.e., camera 24, ranging-sensor 26) and will be understood by those in the art. The controller 36 performs the tracking 58 based initially on signals received by the first-sensor 16 while the object-of-interest 44 is exposed (i.e. visible, unobstructed first-line-of-sight 48, etc.) in the first-field-of-view 18. The obstruction 46 may cause an abrupt loss of tracking-data from the object-of-interest 44 to the first-sensor 16, whereby the controller 36 determines that the obstruction 46 is present.

Step 206, DETECT OBJECTS IN SECOND-FIELD-OF-VIEW, includes detecting objects 22 in a second-field-of-view 34 with the second-sensor 14.

The system 10 also includes the second-sensor 14 positioned at a second-location 28 that is different than the first-location 20. The second-location 28 may be on the host-vehicle 12 (shown as 28A), on a second-vehicle 30 (shown as 28B), or part of a transportation-infrastructure 32 (shown as 28C), as will be described in more detail below. Alternatively, the second-vehicle 30 may be referred to as the alternative-vehicle 30. The second-sensor 14 detects objects 22 in a second-field-of-view 34 that at least partially overlaps the first-field-of-view 18. Depending on the amount of overlap of the second-field-of-view 34 with the first-field-of-view 18, the objects 22 in the second-field-of-view 34 may include the same or different objects 22 than the objects 22 in the first-field-of-view 18, as will become apparent with a reading of the descriptions of the traffic scenarios of FIGS. 2-5 below. The object 22 that is detected in both the first-field-of-view 18 and the second-field-of-view 34 may be determined to be the same object 22 based on the position of the object 22. That is, the position of the object 22 may have the same coordinates of latitude, longitude, and elevation in the first-field-of-view 18 as the coordinates in the second-field-of-view 34.

Step 208, SELECT SECOND-SENSOR, includes selecting the second-sensor 14 with the controller 36 to detect the object-of-interest 44 in accordance with a determination that the obstruction 46 blocks the first-line-of-sight 48 between the first-sensor 16 and the object-of-interest 44.

FIG. 2 illustrates a traffic scenario where the host-vehicle 12 equipped with the system 10 is approaching a crosswalk on a roadway 40 and a pedestrian 38 is also attempting to cross the roadway 40 in the crosswalk. A lead-vehicle 42 is disposed between the host-vehicle 12 and the pedestrian 38 such that the lead-vehicle 42 blocks a portion 43 of the first-field-of-view 18 of the first-sensor 16 (i.e. the camera 24).

The controller 36 selects the second-sensor 14A to detect the object-of-interest 44 (i.e. the pedestrian 38) in accordance with the determination that the obstruction 46 (i.e. the lead-vehicle 42) blocks the first-line-of-sight 48 between the first-sensor 16 and the object-of-interest 44. In the example illustrated in FIG. 2, the second-sensor 14A is mounted on a front right-corner of the host-vehicle 12. The second-sensor 14A may be one of either the camera 24 or the ranging-sensor 26 that is in a different location (i.e. the second-location 28A) relative to the first-sensor 16. The obstruction 46 may be any obstruction 46 including a building, signage, or construction-barriers, for example. In the example illustrated in FIG. 2, the object-of-interest 44 is the pedestrian 38 in the roadway 40, but may be any object-of-interest 44, including a lane-marking 50, a traffic-intersection 52, an edge 54 of the roadway 40, or an other-vehicle 56.

When the object-of-interest 44 is the lane-marking 50 and/or the edge 54 of the roadway 40, the system 10 provides the technical benefits of improving a road-model and/or improving a lane-keeping-algorithm that may use these features of the roadway 40 as inputs. When the object-of-interest 44 is the traffic-intersection 52, the system 10 provides the technical benefit of improving safety when the host-vehicle 12 is passing through the traffic-intersection 52 that is obscured by buildings, trucks, etc. In addition, the system 10 provides the technical benefit of improving safety when the host-vehicle 12 is making a left-hand turn at the traffic-intersection 52 behind a large vehicle (e.g. a Class 8 truck) that may block oncoming traffic or may obscure a traffic-light.

The controller 36 selects the second-sensor 14 with an unobstructed second-line-of-sight 60 to the object-of-interest 44. The second-sensor 14 then tracks 58 the object-of-interest 44 in the second-field-of-view 34, wherein the second-sensor 14 detects at least a part of the object-of-interest 44. In the example illustrated in FIG. 2, the controller 36 selects the second-sensor 14A mounted on the host-vehicle 12 with the second-line-of-sight 60A.

Described another way, the controller 36 tracks 58 the pedestrian 38 while the pedestrian 38 is in plain view of the first-sensor 16. When the view of the pedestrian 38 to the first-sensor 16 is blocked by the lead-vehicle 42, the controller 36 determines that the associated loss of tracking-data from the pedestrian 38 is caused by the lead-vehicle 42. The controller 36 then selects the second-sensor 14A, that has the unobstructed view of the pedestrian 38, to resume the tracking 58 of the pedestrian 38. If the view of the second-sensor 14A to the pedestrian 38 is blocked, then the controller 36 may select another second-sensor (14B or 14C) that has the unobstructed view of the pedestrian 38.

FIG. 3 illustrates another traffic scenario where the second-vehicle 30 is at the traffic-intersection 52 and the second-sensor 14B is mounted on the second-vehicle 30 that has the unobstructed view of the object-of-interest 44 (i.e. the pedestrian 38). The second-sensor 14B may be one of either the camera 24 or the ranging-sensor 26 that is in a different location relative to the first-sensor 16 (i.e. the second-location 28B). Data from the second-sensor 14B mounted on the second-vehicle 30 is both requested 64 and transferred 66 from the second-vehicle 30 to the host-vehicle 12 using a communications protocol, such as dedicated short range communications (DSRC), Bluetooth®, cellular or other ad hoc protocols. The data is both requested 64 and transferred 66 from the second-vehicle 30 by way of a transceiver 68 (see FIG. 1) mounted on the host-vehicle 12 that is also in communication with the controller 36.

FIG. 4 illustrates yet another traffic scenario where the second-sensor 14C is part of a transportation-infrastructure 32 (e.g. mounted to a traffic light at the second-location 28C) located proximate the traffic-intersection 52, and has the unobstructed view of the object-of-interest 44. The second-sensor 14C may be one of either the camera 24 or the ranging-sensor 26 that is in a different location relative to the first-sensor 16. Data from the second-sensor 14C that is part of the transportation-infrastructure 32 is both requested 64 and transferred 66 from the transportation-infrastructure 32 to the host-vehicle 12 using a communications protocol, such as DSRC, UHF, VHF, Bluetooth®, cellular WiMAX, GSM, 3G or other ad hoc protocols. The data is both requested 64 and transferred 66 from the transportation-infrastructure 32 by way of the transceiver 68 mounted on the host-vehicle 12 that is also in communication with the controller 36, as illustrated in FIG. 1.

In the traffic scenarios illustrated in FIGS. 2-4, the second-sensor 14 may be a directional-sensor 72 where the second-field-of-view 34 (i.e. 34A-34C) may be adjusted to detect the object-of-interest 44. That is, the controller 36 may rotate the second-sensor 14 that is the directional-sensor 72 as necessary, and/or may change an angle-of-elevation of a bore-site of the second-sensor 14 as necessary to capture the object-of-interest 44. The controller 36 may adjust the second-field-of-view 34 as required to resume tracking 58 the object-of-interest 44.

FIG. 5 illustrates yet another traffic scenario with all three second-sensors 14A-14C present. The controller 36 may further select the second-sensor 14 based on a proximity of the second-sensor 14 to both the host-vehicle 12 and the object-of-interest 44. The controller 36 polls (i.e. samples, surveys) the available second-sensors 14 within a communications-range via the second-sensor's 14 respective communications protocol and prioritizes the data based on the second-sensor's 14 point-of-view 74, sensor-distance 76 from the host-vehicle 12, and object-distance 78 to the object-of-interest 44. As used herein, the point-of-view 74 is the position of the second-sensor 14 from which the object-of-interest 44 is detected. The controller 36 may select the second-sensor 14 with the point-of-view 74 that provides a least obstructed view of the object-of-interest 44. For example, the second-sensor 14B mounted on the second-vehicle 30 provides the least obstructed point-of-view 74B of the pedestrian 38 compared to the point-of-view 74A of the second-sensor 14A mounted on the host-vehicle 12. Therefore, the second-sensor 14B may be assigned a higher priority than the second-sensor 14A. Similarly, the second-sensor 14C mounted to the traffic light may have the least obstructed view of the pedestrian 38 compared to the second-sensor 14B mounted on the second-vehicle 30 (possibly due to its greater elevation above the traffic-intersection 52), and may be assigned a higher priority than the second-sensor 14B.

The sensor-distance 76 from the host-vehicle 12 (i.e. the distance from the second-sensor 14B, 14C to the host-vehicle 12) is prioritized because a signal-strength and a signal-quality of the data transferred 66 by the second-sensor 14B-14C may be affected by the sensor-distance 76B, 76C. Therefore, the second-sensor 14B, 14C with the shortest sensor-distance 76B, 76C may be assigned a higher priority by the controller 36.

The object-distance 78 (i.e. the distance from the second-sensor 14 to the object-of-interest 44) is prioritized because a resolution of the object-of-interest 44 depicted in the image produced by the second-sensor 14 may be affected by the object-distance 78A, 78B, 78C. Therefore, the second-sensor 14 with the shortest object-distance 78A, 78B, 78C may be assigned a higher priority by the controller 36.

The controller 36 may also prioritize the second-sensor 14 by a sensor-type (i.e. the camera 24 or the ranging-sensor 26). The controller 36 may assign the higher priority to the second-sensor 14 that provides the higher resolution of the object-of-interest 44 depicted in the image produced by the second-sensor 14. The inherent resolutions of the various sensor-types will be understood by one skilled in the art.

Accordingly, a detection system 10 (the system 10), a controller 36 for the system 10, and a method 200 of operating the system 10 are provided. The system 10 is beneficial because the system 10 uses the second-sensor 14 to track 58 the object-of-interest 44 when the obstruction 46 blocks the first-line-of-sight 48 of the first-sensor 16.

While this invention has been described in terms of the preferred embodiments thereof, it is not intended to be so limited, but rather only to the extent set forth in the claims that follow.

We claim:

1. A detection system, comprising:
   a first-sensor positioned at a first-location on a host-vehicle, the first-sensor detecting and tracking objects in a first-field-of-view;
   a plurality of second-sensors positioned at a plurality of second-locations different than the first-location, each of said plurality of second-sensors detecting objects in its respective second-field-of-view that at least partially overlaps the first-field-of-view;
   a controller in communication with the first-sensor and the plurality of second sensors, the controller configured to:
   track at least one object-of-interest in the first-field-of-view;
   determine, during the tracking, that the first-field-of-view has become obstructed;
   responsive to determining that the first-field-of-view has become obstructed:
   select a second-sensor that has a least obstructed view of the object-of interest among the plurality of second-sensors;
   receive sensor data from the second-sensor including the object-of interest;
   use the sensor data to track the object-of-interest; and
   operate the host-vehicle in a fully autonomous mode to avoid interference or collision with the object-of-interest.

2. The detection system in accordance with claim 1, wherein the second-sensor is mounted on the host-vehicle.

3. The detection system in accordance with claim 1, wherein the second-sensor is mounted on a second-vehicle.

4. The detection system in accordance with claim 3, wherein data from the second-sensor is both requested and transferred from the second-vehicle to the host-vehicle using a communications protocol.

5. The detection system in accordance with claim 1, wherein the second-sensor is part of a transportation-infrastructure.

6. The detection system in accordance with claim 5, wherein data from the second-sensor is requested from the transportation-infrastructure by the host-vehicle using a communications protocol.

7. The detection system in accordance with claim 5, wherein data from the second-sensor is transferred from the transportation-infrastructure to the host-vehicle using a communications protocol.

8. The detection system in accordance with claim 1, wherein the second-sensor is directional and the second-field-of-view is adjusted to detect the object-of-interest.

9. The detection system in accordance with claim 1, wherein the controller selects the second-sensor based on a proximity of the second-sensor to both the host-vehicle and the object-of-interest.

10. The detection system in accordance with claim 9, wherein the controller polls available sensors within a communications-range and prioritizes data from the available sensors by a point-of-view of the second-sensor, a sensor-distance of the second-sensor from the host-vehicle, and an object-distance of the second-sensor to the object-of-interest.

11. The detection system in accordance with claim 1, wherein the object-of-interest is a pedestrian.

12. The detection system in accordance with claim 1, wherein the object-of-interest is an other-vehicle.

13. The detection system in accordance with claim 1, wherein the object-of-interest is a lane-marking.

14. The detection system in accordance with claim 1, wherein the object-of-interest is an edge of a roadway.

15. The detection system in accordance with claim 1, wherein the object-of-interest is a traffic-intersection.

16. A detection method, comprising:
   detecting and tracking objects in a first-field-of-view with a first-sensor, the first-sensor positioned at a first-location on a host-vehicle;
   detecting objects in a second-field-of-view with a plurality of second-sensors, the plurality of second-sensors positioned at a plurality of second-locations different than the first-location, the second-field-of-view of each of the plurality of second-sensors at least partially overlapping the first-field-of-view;
   tracking, with a controller in communication with the first-sensor and the plurality of second-sensors, at least one object-of-interest in the first-field-of-view;
   determining, during the tracking, that the first-field-of-view has become obstructed;
   responsive to determining that the first-field-of-view has become obstructed:
   selecting, with the controller, a second-sensor from the plurality of second sensors that has a least obstructed view of the object-of-interest among the plurality of second-sensors;
   receiving sensor data from the second-sensor including the object-of-interest;
   using the sensor data to track the object-of-interest; and
   operating the host-vehicle in a in a fully autonomous mode to avoid interference or collision with the object-of-interest.

17. The detection method in accordance with claim 16, wherein the second-sensor is mounted on the host-vehicle.

18. The detection method in accordance with claim 16, wherein the second-sensor is mounted on a second-vehicle.

19. The detection method in accordance with claim 18, wherein data from the second-sensor is both requested and transferred from the second-vehicle to the host-vehicle using a communications protocol.

20. The detection method in accordance with claim 16, wherein the second-sensor is part of a transportation-infrastructure.

21. The detection method in accordance with claim 20, wherein data from the second-sensor is requested from the transportation-infrastructure by the host-vehicle using a communications protocol.

22. The detection method in accordance with claim 20, wherein data from the second-sensor is transferred from the transportation-infrastructure to the host-vehicle using a communications protocol.

23. The detection method in accordance with claim 16, wherein the second-sensor is directional and the second-field-of-view is adjusted to detect the object-of-interest.

24. The detection method in accordance with claim 16, wherein the controller selects the second-sensor based on a proximity of the second-sensor to both the host-vehicle and the object-of-interest.

25. The detection method in accordance with claim 24, wherein the controller polls available sensors within a communications-range and prioritizes data from the available sensors by a point-of-view of the second-sensor, a sensor-distance of the second-sensor from the host-vehicle, and an object-distance of the second-sensor to the object-of-interest.

26. The detection method in accordance with claim 16, wherein the object-of-interest is a pedestrian.

27. The detection method in accordance with claim 16, wherein the object-of-interest is an other-vehicle.

28. The detection method in accordance with claim 16, wherein the object-of-interest is a lane-marking.

29. The detection method in accordance with claim 16, wherein the object-of-interest is an edge of a roadway.

30. The detection method in accordance with claim 16, wherein the object-of-interest is a traffic-intersection.

\* \* \* \* \*